Dec. 7, 1948.    G. D. DICKEY    2,455,409
ROTARY FILTER
Filed Sept. 21, 1945    2 Sheets-Sheet 1
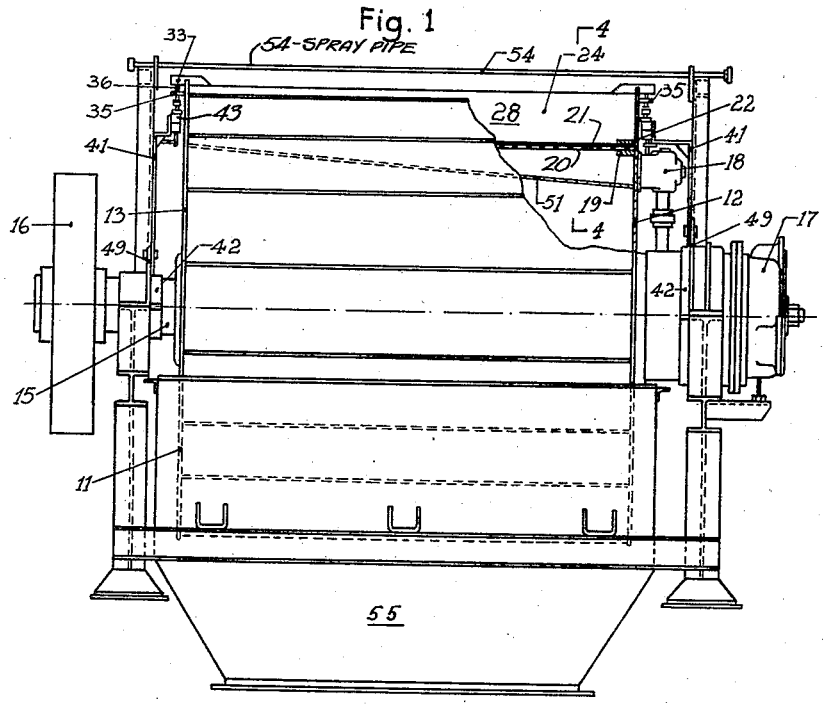
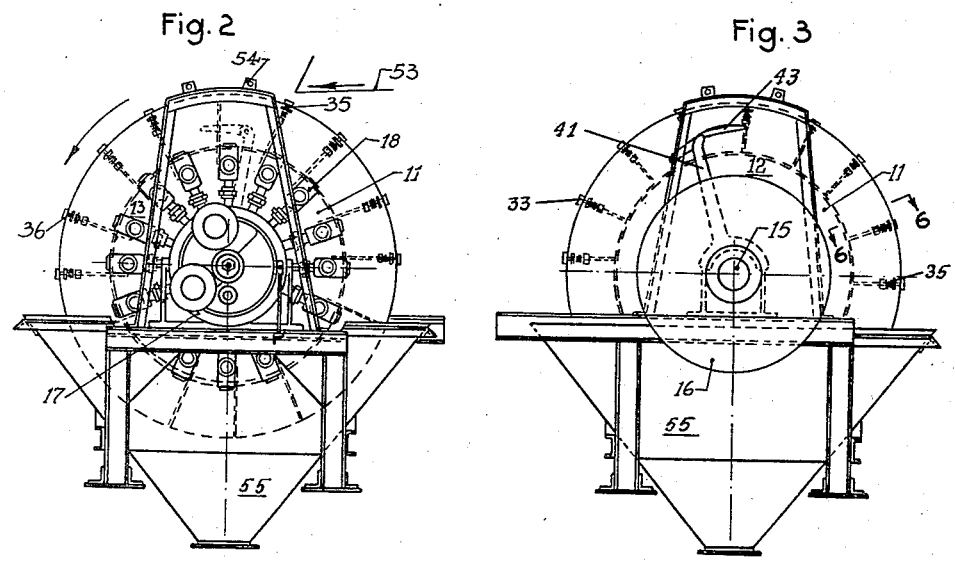
INVENTOR.
George D. Dickey
BY Arthur F. Robert
Attorney Dec. 7, 1948.  G. D. DICKEY  2,455,409
ROTARY FILTER
Filed Sept. 21, 1945  2 Sheets-Sheet 2
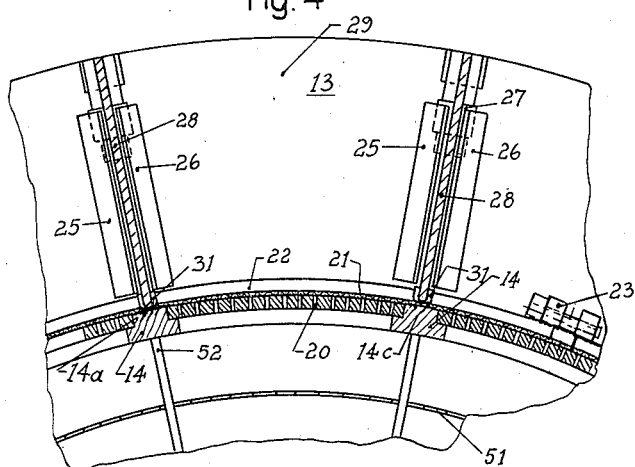
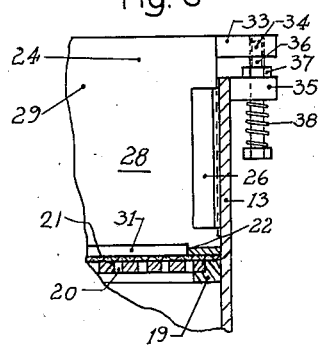
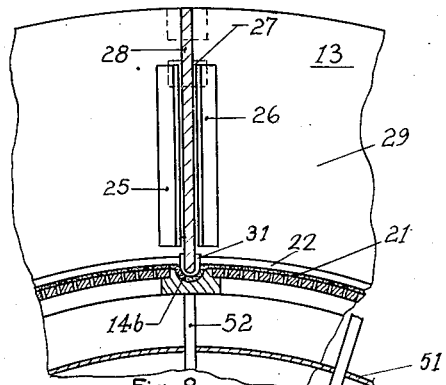
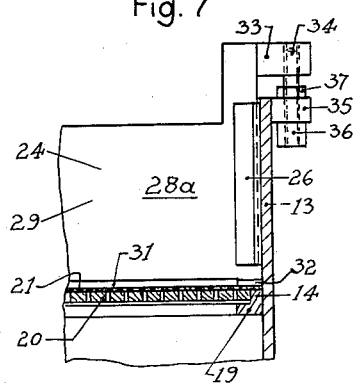
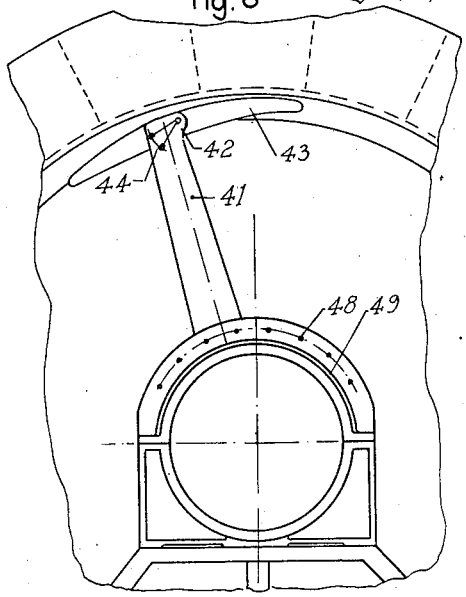
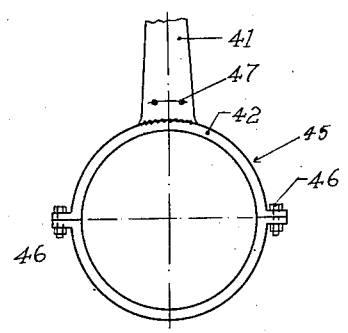
INVENTOR.
George D. Dickey
BY Arthur F. Robert
Attorney Patented Dec. 7, 1948

2,455,409

UNITED STATES PATENT OFFICE 2,455,409

ROTARY FILTER

George D. Dickey, New York, N. Y., assignor of one-half to Henry M. Hunter, New York, N. Y.

Application September 21, 1945, Serial No. 617,770

11 Claims. (Cl. 210—199)

This invention relates to continuous rotary hopper dewaterers of the vacuum type, and more particularly to the general hopper construction thereof.

Hopper dewaterers of this type normally comprise a squirrel cage-like drum having a series of axially extending cross bars spaced about its periphery, adjacent cross bars constituting supports for individual arcuate shaped filter screens. The interior of the drum is normally connected to a vacuum source and divided into a series of radially disposed chambers corresponding to the filter screens where by well known means, vacuum may be selectively applied to the chambers in different positions of the cycle of rotation of the drum to effect dewatering through the filter screens. End walls are extended from the ends of the drum to define an annular peripheral channel about the drum periphery in which the substance to be dewatered is processed.

Prior practice has involved the fixed or permanent installation of a series of radial partitions or plates between the opposite end walls to define hoppers in conjunction with each of the filter screens. Individual filtering cloths have been placed in the bottom or drum side of each of the hoppers and suitably secured and sealed along their edges.

In operation of the dewaterer, a slurry is fed to the hoppers as they approach the upper cycle of rotation of the drum and vacuum applied to the underlying compartments to effect filtration through the filter medium and filter screen as the hopper descends in the cycle. At some selected point in the continued path of rotation, the vacuum is released and the filter cake discharged from the hopper.

The arrangements heretofore employed have been disadvantageous in a number of respects. For instance, in the replacement of the filter cloths, the operation of removing the old cloth from the bottom of each hopper, replacing it and its securing frame, and screwing the frame to the drum at closely spaced intervals to insure an adequate seal, must be repeated for each of the hoppers. In addition, the use of a fixed hopper partition has prevented the most efficient removal of the filter cake at the point of discharge.

In eliminating the aforesaid objections and others, it is an object of my invention to provide a vacuum dewaterer of the type herein described wherein a substantially one piece filter medium can be employed, the hopper partitions being arranged to be readily removed and eliminated as regards replacement of the filter medium.

A further object of my invention is the provision of a novel form of partition or hopper-forming plate in combination with a single one-piece filter medium for the drum whereby adequate sealing means is provided between the several hoppers without the necessity of separate sealing clamps for each hopper.

A further object of my invention is to provide a novel form of hopper-forming partition that may be radially displaced outward during the cycle of rotation of the dewaterer to facilitate the discharge of the filter cake.

Still a further object of my invention is the provision of a novel type of internal vacuum dewaterer whereby the discharge of liquid is more readily facilitated and the application of vacuum to the contained sludge made more uniform.

Further objects of my invention will appear from the following description of a preferred embodiment of my invention, wherein:

Figure 1 is a front elevation of a continuous rotary hopper dewaterer showing the shape of the internal vacuum chamber of my invention and the means for resiliently securing the hopper partitions in position.

Figure 2 is an end elevation of the vacuum end of the machine of Figure 1, illustrating the cam means operable to displace the partitions radially on the vacuum side.

Figure 3 is an end elevation of the drive end of the machine of Figure 1, showing the cam means operable to displace the hopper partitions.

Figure 4 is a partial section taken on the line 4—4 of Figure 1 showing a portion of the filter medium and the method of mounting the hopper partitions.

Figure 5 is a view similar to Figure 4, showing a modified form of sealing means between the hopper partition and the filter medium.

Figure 6 is a partial section taken on line 6—6 of Figure 3, showing in detail the means by which the hopper partitions are resiliently secured.

Figure 7 is a view similar to Figure 6 showing a modification in which the hopper partitions are fixedly secured and also showing the manner in which the hopper partitions may be formed as weirs to reduce the depth of the hoppers, the bands 22 being omitted to show the partitions cut away at 32.

Figure 8 is an elevation of the cam assembly for displacing the hopper partitions.

Figure 9 is a detail of the means for mounting the cam assembly about the shaft of the drum.

Referring to Figures 1, 2 and 3, the dewaterer therein shown includes a drum, generally indicated at 11, and formed as a squirrel cage by end walls 12 and 13 and axially extending cross bars 14, the assembly as such being conventionally mounted on a shaft 15 arranged to be rotated through a drive mechanism 16. Opposite the drive end of the drum is a valve mechanism 17 connected to a source of vacuum and fluid collecting means in well known manner. The vacuum is applied to the several filter sections of the drum by conduits 18, the application of vacuum being selective throughout the rotation of the drum through valve mechanism 17 in conventional manner.

Cross bars 14 are secured to the end walls by angles 19 and are spaced peripherally about the drum, a filter screen section 20 being mounted on each pair of adjacent cross bars, the aggregate of the filter screens forming a base for the filter medium 21.

The filter medium is in the form of a sheet of a length to extend around the drum at least once and is mounted on the exterior of the filter screens. The filter medium is secured in position and sealed at its edges by two circular bands or clamps 22, one band being placed adjacent each of the end walls (Figures 6 and 7). Each band is of a length slightly less than the diameter of the screen assembly and is provided with lugs 23 arranged to be secured and drawn together by a bolt or equivalent fastening means.

The end walls 12 and 13 of the drum extend beyond the filter medium to define a peripheral channel 24. Each of the end walls is provided with adjacent angles 25 and 26, welded or otherwise secured to the end walls to form channels 27 in radial alignment with the cross bars. The channels so formed are disposed opposite one another to receive a plate or hopper partition 28. These partitions, when in place, form a peripherally spaced series of hoppers 29 in which the material is dewatered.

Hopper partitions 28 are provided with sealing means such as rubber or composition channel members 31, on their inner edges arranged to engage the filter medium and compress it against the underneath cross bar in sealing relation. In the modification shown in Figure 4, the cross bars are formed with outwardly extending ribs 14a to produce the seal with channels 31, the shoulders formed at each side of the ribs 14a serving as seats for the filter screens.

In the modification shown in Figure 5, the cross bar is formed with a channel or groove 14b in the rib arranged to receive a portion of the filter medium therein when so forced by sealing member 31 and provide a seal between adjacent hoppers.

To accommodate the filter screen clamping bands 22, the inside corners of the hopper partitions are cut away at 32 (Figures 6 and 7) and may also be provided with channel seals or the like on the edges so formed.

Each hopper partition is formed with a lug 33 at its outer corner extending over the end walls, the lug being tapped at 34. The end plates are formed with lugs 35 adjacent lugs 33 and bored to receive bolts 36 which extend upwardly as viewed in Figs. 6 and 7 to engage the tapped hole of lug 33. Thus when bolts 36 are screwed into lug 33, the hopper partition is pulled down and held in sealing position. Lock nuts 37 may be provided to lock the bolts.

In the modification of Figure 6, the parts are similar except that coil springs 38 of the requisite strength are inserted to operate between the under surface of lugs 35 and the upper faces of the bolt head. Thus the hopper partition is resiliently held in sealing position and may be raised by the application of sufficient force to move bolt 36 radially outward against the force of the spring.

In the modification of Fig. 6, cams are provided at each end of the drum to engage bolts 36 so as to raise the hopper partitions. Referring to Fig. 8, which is a view of the drive end of the drum, and Fig. 9, an arm 41 is provided with a pivot 42 at its outer end arranged to support a cam 43. Cam 43 and arm 41 are provided with holes 44 in which pins may be inserted to vary the position of the cam and the corresponding displacement of the hopper partitions. Arm 41 is secured at its inner end to a strap 45, of a size to be loosely clamped around the shaft at the drive end of the drum, or about a portion of the valve mechanism at the vacuum end, by bolts 46. In the latter case, arm 41 will be shorter and the strap of larger diameter.

To facilitate adjustment of position of the cam and insure its retention in the adjusted position, arm 41 is formed with pin holes 47 while an arcuate shaped member 49 secured to each end of the assembly as shown in Figs. 1 and 8, is formed with a series of similar pin holes 48. Accordingly, the arm may be angularly moved to any of a series of positions in which holes 47 and 48 are aligned and then held in such position by pins inserted in such aligned holes.

While cams 43 are shown in operation at the top of the drum, it is to be understood that they may be positioned to function wherever desired in the cycle of the dewaterer.

To insure uniform application of vacuum to the underside of the filter medium and proper drainage of the removed liquid, a substantially continuous frustro-conical drum 51 is provided within the drum assembly, the continuity of the conical drum being broken by the radial partitions 52 extending from the interior of the drum to the cross bars. The conical drum provides, in combination with the internal radial partitions, a chamber beneath each hopper that is sealed except with respect to the hopper and tapers from the drive end of the assembly to the vacuum end. This provides an inclined drainage surface at the top of the drum where the feeding and washing is accomplished and insures the drainage of all fluid into the corresponding vacuum connection. Moreover the tapering chamber by reason of its reduced cross section in proportion to the distance from the vacuum source assists in the application of a uniform vacuum to the entire hopper and produces a more uniformly dewatered cake.

In operation, the material is fed to the rotating dewaterer by a conventional feed trough 53 and deposited in the hoppers. As the drum rotates, vacuum is applied to the underside of the hopper and the material washed, if desired through spray pipe 54. At a predetermined point in the cycle of rotation and preferably near the discharge topper 55, the cams are positioned to force the hopper partitions outwardly. Since the hopper tapers toward its inner ends, this action tends to loosen the cake and facilitate its discharge.

If it is desired to reduce the depth of the hoppers, hopper partitions of the type shown at 28a in Fig. 7 resembling weirs, may be substituted for the regular hopper partitions. This increases the flexibility of the mechanism and its range of use.

Having described my invention, I claim:

1. A continuous rotary hopper dewaterer of the vacuum type comprising: a rotatable drum to which vacuum is applied; a filter medium on the surface of the drum; end walls on the drum extending beyond the periphery thereof and cooperating therewith to define an annular outwardly open peripheral channel; a series of radial partitions extending across the channel at spaced peripheral intervals to divide it into a series of outwardly open hoppers, said partitions being mounted at opposite ends upon opposed walls for movement into and out of hopper forming engagement with the drum; yieldable means connecting each end of each partition to the adjacent end wall and yieldably urging the partitions toward and holding them in said hopper forming engagement; and means for moving the partitions out of said hopper forming engagement with the drum as they successively enter a predetermined zone in the cycle of drum rotation and for holding them out of such engagement over a predetermined angle of drum rotation.

2. A continuous rotary hopper dewaterer of the vacuum type comprising: a drum to which vacuum is applied; a filter medium about the periphery of the drum; end walls on the drum extending beyond the periphery thereof and cooperating therewith to define an annular outwardly open peripheral channel; a series of radially disposed channel-forming members on each opposed face of the end walls, each member on one face being opposed to a corresponding member on the opposite face; and a series of radial partitions extending across the peripheral channel to divide it into an annular series of outwardly open hoppers, each partition having its opposed ends slidably mounted in opposed channels.

3. The vacuum dewaterer of claim 2 wherein lugs are provided on the partition adjacent their outer ends in paired relation with lugs on the end walls; and resilient means are provided for securing the paired lugs together whereby the partitions can be yieldingly moved outwardly in a radial direction from the drum.

4. A continuous rotary hopper vacuum dewaterer, comprising: a drum having end walls extending beyond the periphery of the drum, to define an annular peripheral channel; peripherally spaced radially removable partitions extending across the channel to divide it into a series of adjacent hoppers; lugs on the outer corners of the partitions; corresponding lugs on the end plates adjacent the partition lugs; and means to secure the partition lugs and end wall lugs together to maintain said partitions in position.

5. The dewaterer of claim 4 wherein the securing means includes yieldable means urging the partitions inwardly, said yieldable means permitting limited outward radial movement of the partitions.

6. The dewaterer of claim 4 wherein the securing means includes members fixedly secured to the partition lugs and movably mounted in the end wall lugs with resilient means arranged to maintain the partitions in their innermost position; and a cam positioned to engage the securing means in a predetermined zone of the cycle of rotation of the drum and move the securing means against the action of the resilient means in a direction to move the partitions radially outward.

7. A continuous rotary hopper dewaterer of the vacuum type wherein, during each rotation of the dewaterer, successive points of its periphery pass through feeding and vacuum application zones to form a filter cake and then through a filter cake removal zone, comprising: a squirrel cage arrangement of axially extending peripherally spaced cross bars connected together by peripherally extending axially spaced arcuate end bars, each adjacent pair of peripherally spaced cross bars and axially spaced end bars cooperating with each other to form a peripheral opening and being recessed to form a seat around the opening; an endless succession of arcuate screens engaging the bars and cooperating therewith to form a segmental filter drum, each screen being positioned on a seat to extend over the adjacent opening; a pair of radial end walls connected to the ends of the drum and cooperating therewith to form a drum assembly having outwardly open endless channel, the bight of which is formed by the periphery of the drum; a rotatable supporting mechanism for the drum assembly, the mechanism including means for enclosing the space underneath each drum segment to form a filter compartment which is arranged for connection to a suction line during its travel through the vacuum application zone; a sheet of filtering material wrapped around the bight of said channel; a pair of axially spaced end clamping bands encircling the wrapped filter material for sealing it along its opposite end margins and for removably clamping it to the drum; a series of radial partitions dividing the channel into a series of outwardly open hoppers, each partition being arranged between the adjacent ends of a pair of drum segments to extend from one end wall to the other in radial alignment with the adjacent cross bar so as to position one hopper over each screen.

8. The dewaterer of claim 7 wherein: each partition is recessed at its inner corners to accommodate the end bands.

9. The dewaterer of claim 7 wherein: the inner edge of each partition is provided with a resilient boot which normally presses against the filter medium for sealing purposes.

10. The dewaterer of claim 7 wherein: the holding means includes resilient members yieldably urging the partitions against the filter medium.

11. The dewaterer of claim 7 wherein: the holding means includes a resilient member yieldably urging the partitions into engagement with the filter medium and permitting limited outward movement of the partitions away from the filter medium; and means are provided for moving the partition outwardly against said resilient means at a predetermined zone during each rotation of the drum.

GEORGE D. DICKEY.

REFERENCES CITED

The following references are of record in the file of this patent:

UNITED STATES PATENTS

| Number | Name | Date |
|---|---|---|
| 819,179 | Shortt | May 1, 1906 |
| 1,348,036 | Mount | July 27, 1920 |
| 1,377,765 | Elling | May 10, 1921 |
| 1,453,311 | Engel, Sr. | May 1, 1923 |
| 1,472,934 | Paull | Nov. 6, 1923 |
| 1,748,081 | Reed et al. | Feb. 25, 1930 |

FOREIGN PATENTS

| Number | Country | Date |
|---|---|---|
| 457,832 | Great Britain | Dec. 7, 1936 |